United States Patent
Lee et al.

(10) Patent No.: US 11,424,549 B1
(45) Date of Patent: Aug. 23, 2022

(54) WIRELESS COVERAGE CONTROL THIN FILM AND WIRELESS ACCESS SYSTEM INCLUDING THE SAME

(71) Applicant: HRL LABORATORIES, LLC, Malibu, CA (US)

(72) Inventors: Hanseung Lee, Thousand Oaks, CA (US); Hyok Song, Oak Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 44 days.

(21) Appl. No.: 16/860,908

(22) Filed: Apr. 28, 2020

Related U.S. Application Data

(60) Provisional application No. 62/941,579, filed on Nov. 27, 2019.

(51) Int. Cl.
*H01Q 15/16* (2006.01)
*H04B 1/38* (2015.01)

(52) U.S. Cl.
CPC .............. *H01Q 15/16* (2013.01); *H04B 1/38* (2013.01)

(58) Field of Classification Search
CPC ........ H01Q 15/14; H01Q 15/16; H01Q 15/23; H04B 1/38; H04W 84/00
See application file for complete search history.

(56) References Cited

U.S. PATENT DOCUMENTS

| | | | |
|---|---|---|---|
| 6,608,607 B2* | 8/2003 | Wu | H01Q 15/0013 343/781 R |
| 7,173,565 B2 | 2/2007 | Sievenpiper | |
| 7,218,281 B2 | 5/2007 | Sievenpiper et al. | |
| 10,581,175 B2* | 3/2020 | Driscoll | G01S 7/4811 |
| 2009/0109121 A1* | 4/2009 | Herz | H01Q 15/0066 343/912 |
| 2010/0302120 A1* | 12/2010 | Crouch | H01Q 3/46 343/837 |
| 2014/0044042 A1* | 2/2014 | Moshfeghi | H04B 7/12 370/328 |
| 2015/0180120 A1* | 6/2015 | Pietraski | H01Q 19/191 342/368 |
| 2018/0356515 A1* | 12/2018 | Martinez-Lorenzo | G01S 13/06 |
| 2020/0389057 A1* | 12/2020 | Hajimiri | B60L 53/53 |

OTHER PUBLICATIONS

Mittra, Raj et al., "Techniques for Analyzing Frequency Selective Surfaces—A Review", Proceedings of the IEEE, vol. 76, No. 12, pp. 1593-1615, Dec. 1988.

Zhang, Yin et al., "Broadband Diffuse Terahertz Wave Scattering by Flexible Metasurface with Randomized Phase Distribution", Scientific Reports, 6:26875, 8 pp., May 2016.

\* cited by examiner

*Primary Examiner* — Blane J Jackson
(74) *Attorney, Agent, or Firm* — Lewis Roca Rothgerber Christie LLP

(57) ABSTRACT

A wireless access system including a wireless transceiver configured to emit electromagnetic radiation and a wireless coverage control thin film. The wireless coverage control thin film includes a thin film and a plurality of conductive patterns on the thin film. The conductive patterns are configured to scatter the electromagnetic radiation emitted by the wireless transceiver.

17 Claims, 5 Drawing Sheets

(1 of 5 Drawing Sheet(s) Filed in Color)

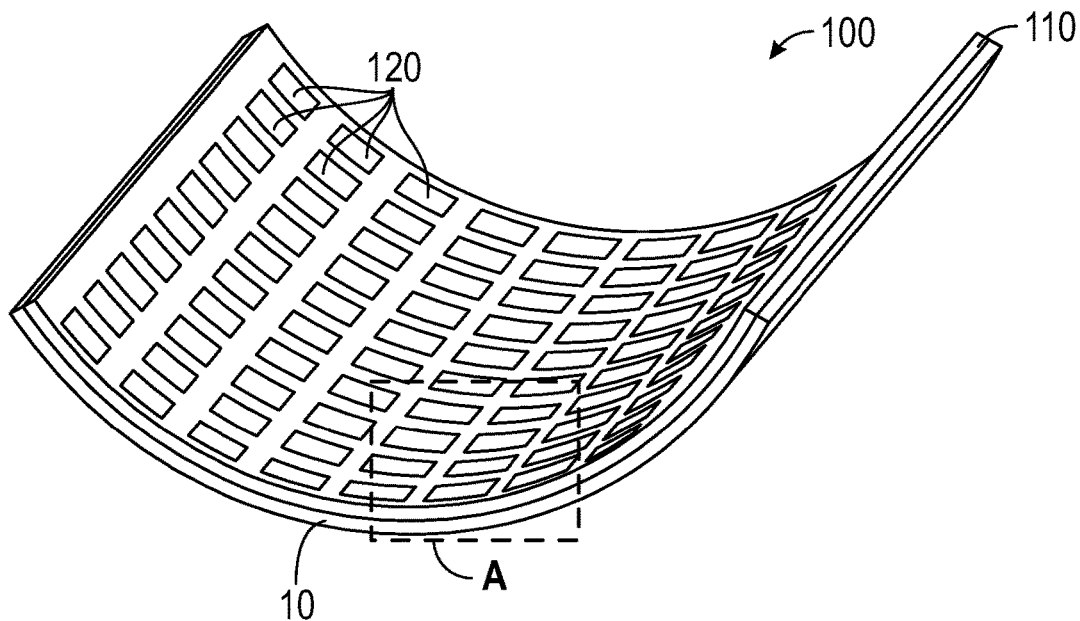
FIG. 1
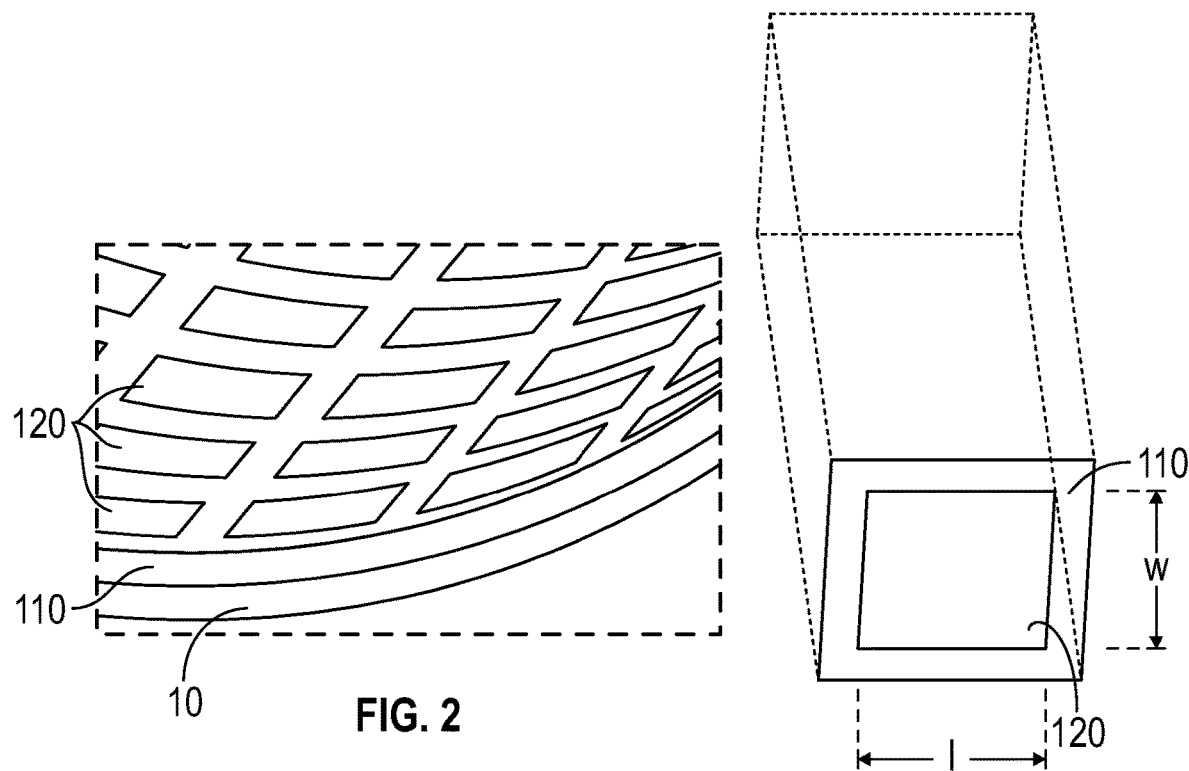
FIG. 2
FIG. 3

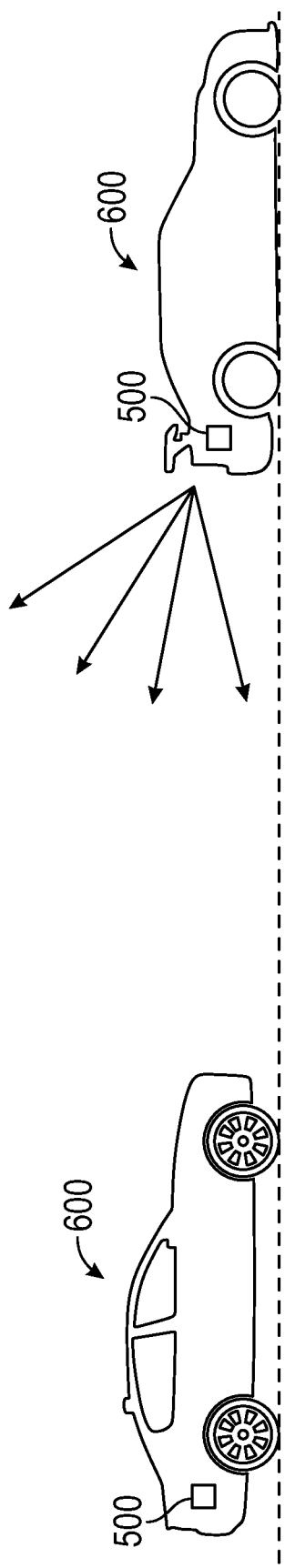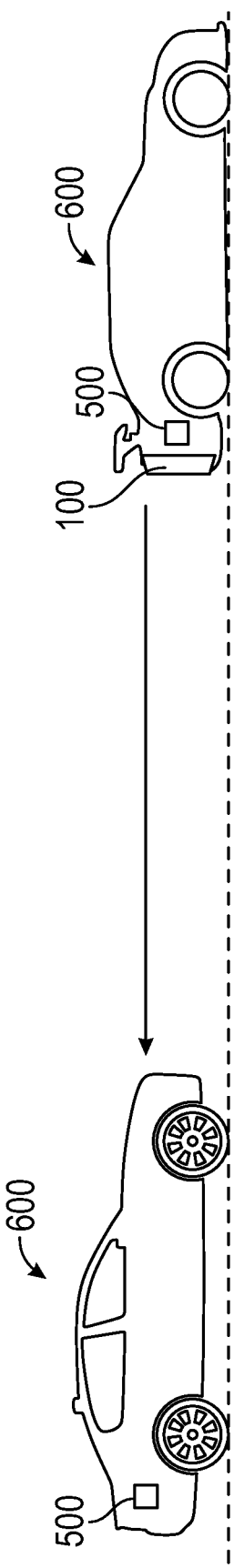
FIG. 6A
FIG. 6B

WIRELESS COVERAGE CONTROL THIN FILM AND WIRELESS ACCESS SYSTEM INCLUDING THE SAME

CROSS-REFERENCE TO RELATED APPLICATION

The present application claims priority to and the benefit of U.S. Provisional Patent Application Ser. No. 62/941,579, filed on Nov. 27, 2019, the entire content of which is incorporated herein by reference.

BACKGROUND

1. Field

One or more aspects of embodiments of the present invention are directed to a wireless coverage control thin film and/or applique and a wireless access system including the wireless coverage control thin film.

2. Related Art

As wireless communication between electronic devices becomes more ubiquitous, there is a demand to increase wireless performance, which may include reducing latency, increasing throughput, increasing range, improving connection stability, etc. The number of wireless communication protocols continues to increase, and some examples of wireless communication protocols include Bluetooth, Zig-Bee, Z-Wave, 3G, 4G, 5G, and the 802.11 family of wireless standards (so-called WiFi), including 802.11a/b/g/n/ac/ax. Each wireless communication protocol may operate on one or more (or within one or more ranges) of frequencies, such as 2.4 GHz and 5 GHz for WiFi, 2.4 GHz for Zigbee, 2.45 GHz for Bluetooth, 908.42 MHz for Z-Wave (in North America), etc.

Wireless transceivers generally include a processor (e.g., a CPU, SoC, etc.) in communication with a radio including one or more antennas (e.g., broadcasting antennas) for emitting and/or receiving wireless signals in the form of electromagnetic radiation (e.g., electromagnetic waves) to and/or from other electronic devices. In some cases, the processor and radio may be integrally formed (e.g., may be part(s) of the same physical component or formed together on a single chip). Using WiFi as an example, both the wireless router and connected electronic device (e.g., smart phone, laptop, etc.) include wireless transceivers and both are configured to send and receive electric signals (e.g., both provide bi-directional communication). The wireless router, however, may also be referred to as a wireless access point (WAP) as it can connect with a plurality of client devices and share a single Internet connection with each of the connected devices.

A broadcasting antenna will generally emit electromagnetic radiation (e.g., electromagnetic waves) equally (or substantially equally) in all directions. But in use, electronic devices are often either sporadically located throughout an area (e.g., throughout a floor or two floors of a building) or are densely located in a small area (e.g., within an aircraft fuselage). Because the antenna of a WAP emits electromagnetic radiation equally in all directions, much of the emission energy is wasted as it propagates away from any connected device (e.g., upwardly through the roof of a building or through the skin of an aircraft fuselage and away from the passengers).

One method of improving wireless performance includes adding additional WAPs, but this method may be prohibitively expensive and/or inefficient. Other attempts have been made to improve wireless performance without increasing the number of WAPs and include, for example, beamforming. Beamforming is the practice of directing the electromagnetic radiation emitted by an antenna toward client devices to improve wireless performance. Beamforming uses an array of antennas (e.g., an antenna array) to direct electromagnetic radiation in one or more particular directions by using constructive and destructive interference. Beamforming has numerous limitations, however, including requiring a plurality of antennas (and wireless communication protocols that allow for a plurality of antennas) and sufficient computing resources to execute the complex mathematical equations that enable beamforming. Importantly, however, there is no economical way to retrofit previous (or existing) non-beamforming wireless transceivers to have this technology. This limitation—an inability to economically retrofit existing wireless transceivers—is faced by other proposed solutions. While some wireless transceivers have become relatively cheap, such as home WiFi routers, making them easily replaceable, it is impractical to replace integrated wireless transceivers, such as those in automobiles, aircraft, etc. As such, there remains a need to improve wireless performance without replacing WAPs.

SUMMARY

Aspects of embodiments of the present invention are directed toward a wireless coverage control thin film and a wireless access system including the wireless coverage control thin film. The wireless coverage control thin film may include a thin film and a plurality of conductive patterns formed on the thin film. The conductive patterns may be arranged in a regular (e.g., a repeating) pattern on the thin film. The wireless access system may include the wireless coverage control thin film and a wireless access point. The wireless coverage control thin film may be configured to efficiently reflect and/or scatter the electromagnetic radiation (e.g., radio waves) emitted by the wireless access point. For example, the size, shape, arrangement density, materials, etc. of the conductive patterns may be suitably varied to efficiently reflect and/or scatter the emissions from the wireless access point in view of the emission frequency (or emission frequency range) of the wireless access point, such as 2.4 GHz or 5 Ghz, etc.

According to an embodiment, a wireless access system includes: a wireless transceiver configured to emit electromagnetic radiation; and a wireless coverage control thin film. The wireless coverage control thin film including: a thin film; and a plurality of conductive patterns on the thin film. The conductive patterns are configured to scatter the electromagnetic radiation emitted by the wireless transceiver.

The conductive patterns may be arranged in a regular pattern.

The conductive patterns may have a square shape with a side length in a range from 1 mm to 100 mm.

The conductive patterns may be electrically isolated from each other.

The thin film may be adhered to a back plane.

The thin film may include silicon.

The conductive patterns may include a conductive metal.

The wireless access system may further include a protective thin film on the conductive patterns.

The wireless transceiver may be configured to emit electromagnetic radiation within a frequency range, and the conductive patterns may be sized and/or spaced from each other such that the conductive patterns scatter the electromagnetic radiation.

According to an embodiment, a wireless coverage control thin film includes: a back plane; a first thin film on the back plane; a first plurality of conductive patterns arranged in a pattern on the first thin film and including a first conductive metal, the first plurality of conductive patterns being electrically isolated from each other; a second thin film on the first plurality of conductive patterns; and a second plurality of conductive patterns on the second thin film and including a second conductive metal, the first conductive metal being different than the second conductive metal. The second plurality of conductive patterns are electrically isolated from each other and from the first plurality of conductive patterns.

The first plurality of conductive patterns may be spaced apart from each other by a first distance, and the second plurality of conductive patterns may be spaced apart from each other by a second distance. The first distance may be different than the second distance.

Ones of the second plurality of conductive patterns may be offset with ones of the first plurality of conductive patterns in a thickness direction of the wireless coverage control thin film.

Each of the first plurality of conductive patterns may have a first surface area, and each of the second plurality of conductive patterns may have a second surface area. The first surface area may be different than the second surface area.

The wireless coverage control thin film may further include a protective layer on the second plurality of conductive patterns.

The first thin film and the second thin film may include silicon.

The back plane may be flexible.

Each conductive pattern in a first group of the first plurality of conductive patterns may have a first shape, and each conductive pattern in a second group of the first plurality of conductive patterns may have a second shape. The first and second shapes may be different from each other.

A center-to-center spacing between adjacent ones of the first plurality of conductive patterns may be in a range of 1.2 mm to 120 mm.

Each of the first plurality of conductive patterns may have a size in one direction in a range of 1 mm to 100 mm.

The back plane may have a surface area in a range of 0.15 $m^2$ to 2.5 $m^2$.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

Figure 4A:
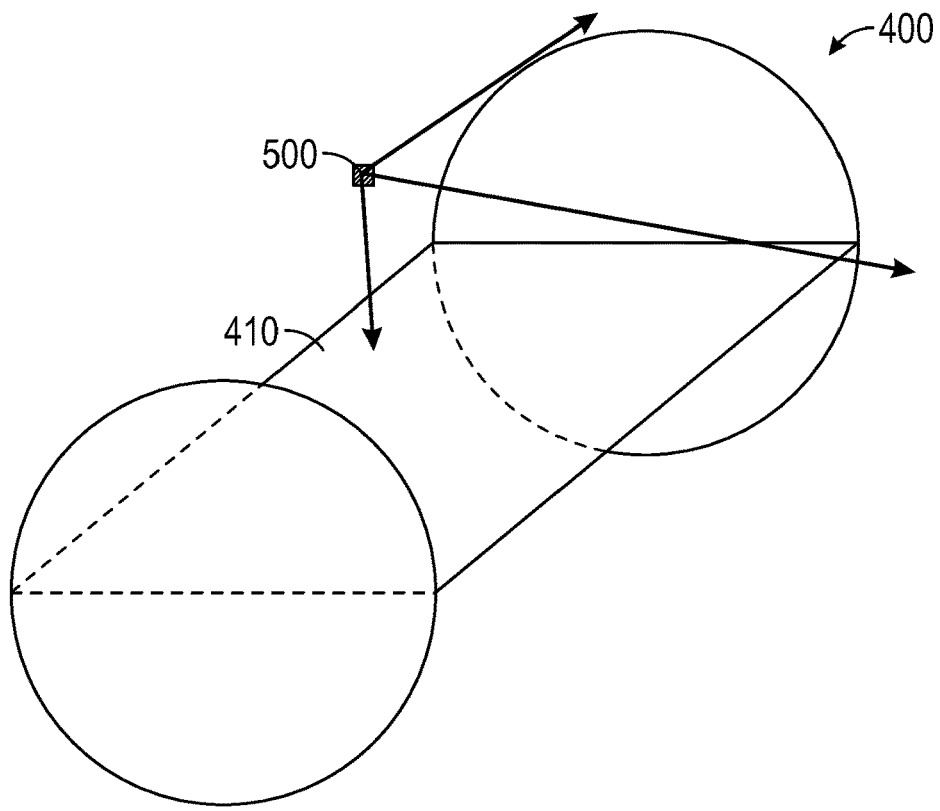
Figure 4B:
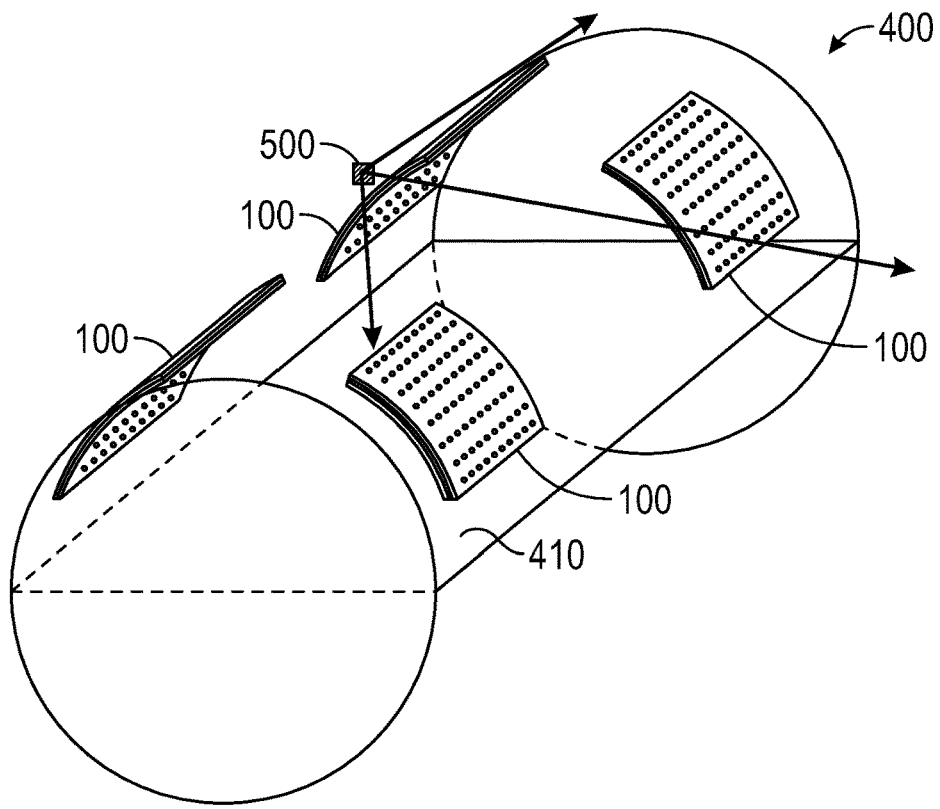
Figure 5A:
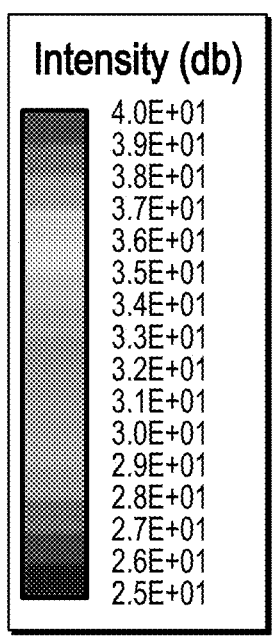
Figure 5A:
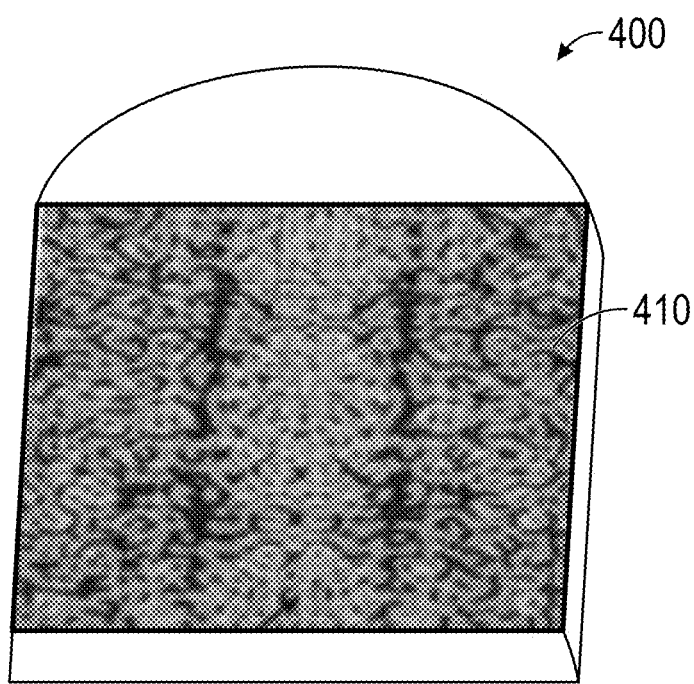
Figure 5B:
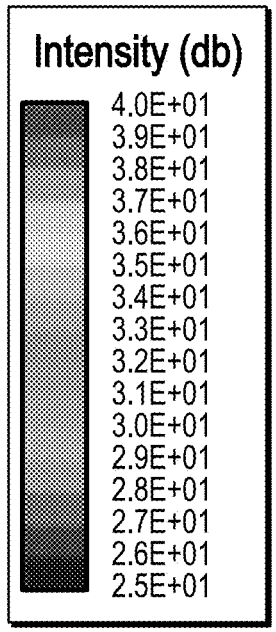
Figure 5B:
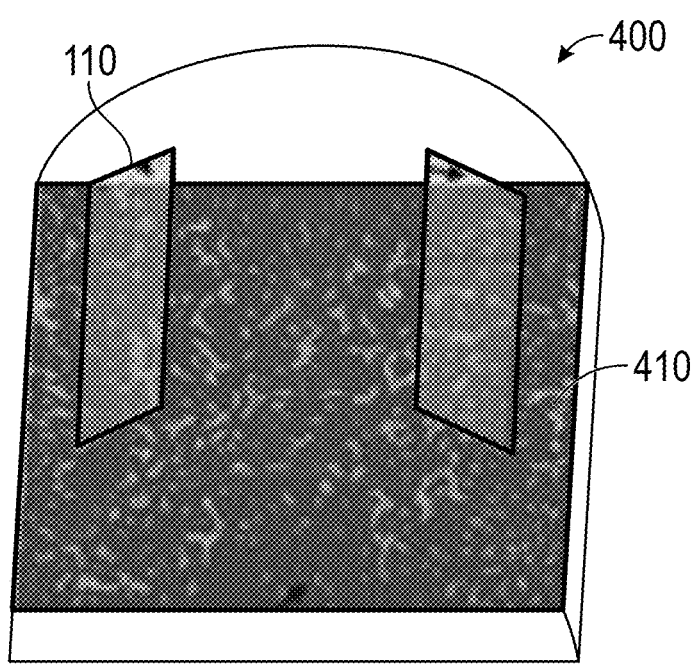
Figure 7:
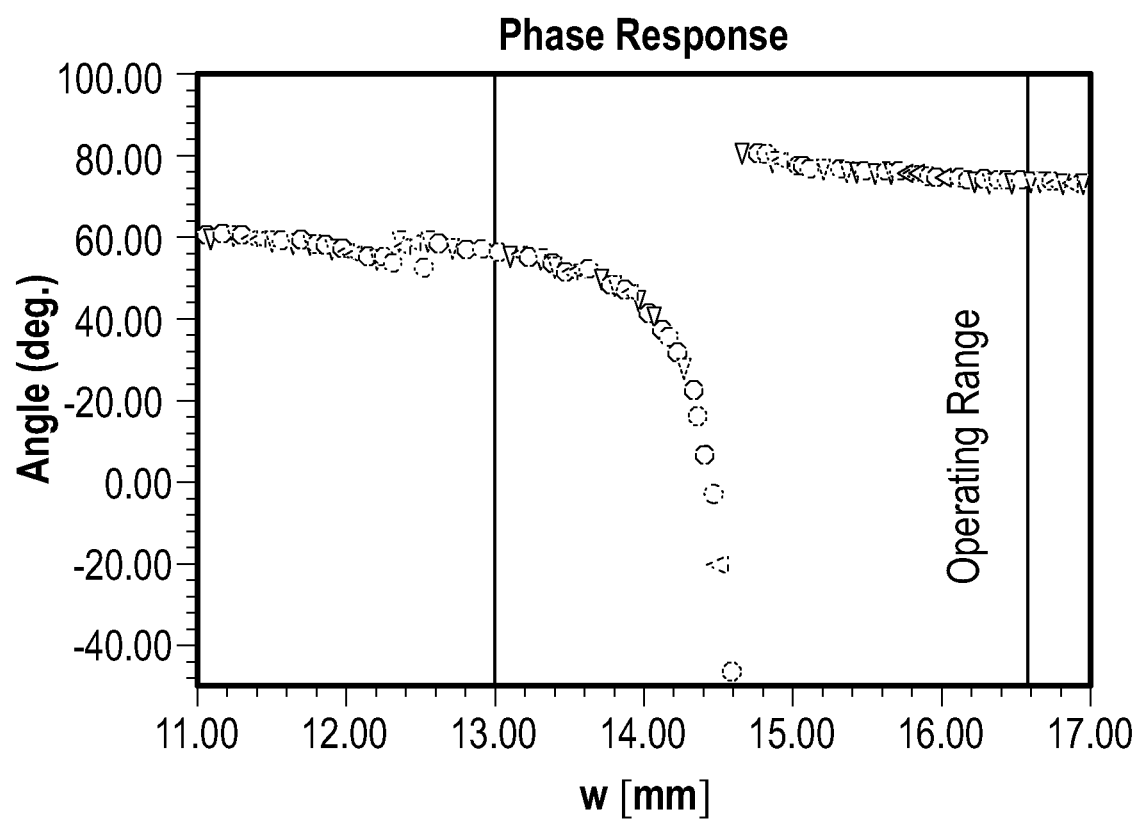

These and other aspects and features of the present invention will be further appreciated and better understood with reference to the specification, claims, and appended drawings, in which:

FIG. 1 is a perspective view of a wireless coverage control thin film according to an embodiment of the present invention;

FIG. 2 is a close-up view of the portion A of FIG. 1;

FIG. 3 is a schematic drawing of one unit cell of the wireless coverage control thin film shown in FIGS. 1 and 2;

FIG. 4A is a schematic representation of a portion of an aircraft fuselage with a single wireless access point (WAP);

FIG. 4B is a schematic representation of a portion of an aircraft fuselage including a wireless access system according to an embodiment of the present invention;

FIG. 5A is a diagram showing wireless coverage in the schematic aircraft fuselage shown in FIG. 4A without the wireless coverage control thin film;

FIG. 5B is a diagram showing wireless coverage in the schematic aircraft fuselage shown in FIG. 4B with the wireless access system according to an embodiment of the present invention;

FIG. 6A is a schematic representation of vehicle-to-vehicle communication without the wireless coverage control thin film;

FIG. 6B is a schematic representation of vehicle-to-vehicle communication with the wireless access system according to an embodiment of the present invention; and FIG. 7 is a graph showing reflected phase changes with respect to conductive pattern size.

DETAILED DESCRIPTION

The detailed description set forth below, in connection with the appended drawings, is intended as a description of example embodiments of the present disclosure and is not intended to represent the only forms in which the present disclosure may be embodied. The description sets forth aspects and features of the present disclosure in connection with the illustrated example embodiments. It is to be understood, however, that the same or equivalent aspects and features may be accomplished by different embodiments, and such other embodiments are encompassed within the spirit and scope of the present disclosure. As noted elsewhere herein, like reference numerals in the description and the drawings are intended to indicate like elements. Further, descriptions of features, configurations, and/or other aspects within each embodiment should typically be considered as available for other similar features, configurations, and/or aspects in other embodiments.

FIG. 1 shows a wireless coverage control thin film 100 according to an embodiment of the present invention. The wireless coverage control thin film 100 is configured to reflect (e.g., scatter) incident electromagnetic radiation emitted from a (e.g., from a nearby) wireless access point (WAP), such as a WiFi router, cell tower, home automation hub, etc.

The wireless coverage control thin film 100 includes a thin film 110 and a plurality of conductive patterns 120 arranged on (or formed on) the thin film 110. The thin film 110 may be placed on (or formed on) a back plane 10. In some embodiments, the back plane 10 may be an integral part of the wireless coverage control thin film 100, such as when the thin film 110 is formed on (e.g., is deposited on) the back plane 10. In other embodiments, the back plane 10 may be separate from the wireless coverage control thin film 100, and in such embodiments, the thin film 110 may be adhered to the back plane 10 after being separately manufactured. For example, the back plane 10 may be an existing surface onto which the thin film 110 is adhered, such as an aircraft fuselage or automobile body panel.

The conductive patterns 120 may be electrically isolated from each other. For example, the conductive patterns 120 may be islands, separated physically and electrically from each other. In some embodiments, the thin film 110 may be formed of silicon and may act as an electrical insulator to insulate the conductive patterns 120 from each other. The silicon thin film 110 may also act to electrically isolate the conductive patterns 120 from the back plane 10.

In some embodiments, a protective thin film (e.g., a protective coating) may be formed (e.g., deposited, printed, etc.) over the conductive patterns 120 to protect the conductive patterns 120 and the exposed surface of the thin film 110 from moisture, oxygen, etc. Some examples of the protective thin film include organic and/or inorganic thin films, including an organic/inorganic layer stack.

In some embodiments, a plurality of layers of conductive patterns 120 may be formed (e.g., stacked) on each other. For example, the wireless coverage control thin film 100 may include a first thin film 110, a first layer of conductive patterns 120 on the first thin film 110, a second thin film on the first layer of conductive patterns, a second layer of conductive patterns on the second thin film, etc. with the uppermost layer of conductive patterns having the protective thin film formed thereon.

The material composition of the layers may be the same or may be different. For example, the first thin film and the second thin film may include (or may be made of) the same or different materials. Similarly, the first layer of conductive patterns and the second layer of conductive patterns may include (or may be made of) the same or different materials.

In some embodiments, ones of the conductive patterns 120 in the second layer may be offset from (e.g., may not overlap) ones of the conductive patterns 120 in the first layer in a thickness direction (e.g., a stacking direction) of the layers.

As described in more detail below, the size (e.g., surface area) of each of the conductive patterns 120 and/or spacing between adjacent ones of the conductive patterns 120 may affect which frequency or frequencies the wireless coverage control thin film 100 most efficiently reflects (or scatters). Thus, the size and/or spacing of the conductive patterns 120 in the first layer, second layer, and any other subsequent layers may be varied to efficiently (or more efficiently) reflect electromagnetic radiation having different frequencies. For example, the first layer of conductive patterns 120 may be configured (e.g., the conductive patterns 120 in the first layer may be sized and/or spaced apart from each other) to efficiently reflect electromagnetic radiation in the 2.4 GHz spectrum, and the second layer of conductive patterns 120 may be configured to efficiently reflect electromagnetic radiation in the 5 GHz spectrum. Thus, a single wireless coverage control thin film 100 may efficiently reflect emissions in both the 2.4 and 5 GHz spectrums (or any other suitable spectrums), which is common in WiFi systems. Hereinafter, an example embodiment of the wireless coverage control thin film 100 including one thin film 110 and one layer of conductive patterns 120 is described for convenience, but the aspects and features described below are applicable to the multi-layer (e.g., multiple layers of conductive patterns) embodiment described above.

The back plane 10 may include (or may be formed of) copper film. But, as discussed above, the back plane 10 may be part of an existing structure, such as an aircraft fuselages or automobile body panel.

The thin film 110 may include (or may be formed of) silicon (Si) or polyethylene terephthalate (PET). The thin film 110 may have a size in a range from about 0.15 m$^2$ to about 2.5 m$^2$ and a thickness in a range from about 0.1 mm to about 5 mm. In one embodiment, the thin film 110 may have a width of about 15 cm and a length of about 1 meter such that it has an approximately rectangular shape, but the thin film 110 is not limited thereto. For example, the thin film 110 may have a square shape, rectangular shape, circular shape, oval shape, or other suitable arbitrary shape.

The conductive patterns 120 may include (or may be formed of) a conductive metal, such as copper, silver, and/or gold. The conductive patterns 120 may be formed by, for example, deposition (e.g., CVD) and printing (e.g., inkjet printing). In some embodiments, the conductive patterns 120 may be separately formed and adhered to the thin film 110, but in other embodiments the conductive patterns 120 may be formed directly on the thin film 110.

The conductive patterns 120 may be arranged in a repeating pattern and/or at regularly spaced intervals. The present invention, however, is not limited thereto, and in some embodiments, the conductive patterns 120 may be arranged at various suitable distances from each other (e.g., may be arranged in an irregular pattern). In some embodiments, the conductive patterns may be spaced apart from each other by a distance (e.g., a center-to-center distance) of about ½λ to about λ wavelength of the signal to be reflected (and/or scattered). In some embodiments, the conductive patterns may be spaced apart from each by a distance (e.g., center-to-center spacing between the conductive patterns) in a range of about 1.2 mm to about 120 mm. As one example, when the center-to-center spacing of the conductive patterns is 1.2 mm, and the conductive patterns have a length of about 1 mm to about 100 mm, the conductive patterns would be spaced apart from each other (e.g., edge-to-edge spacing) by about 0.2 mm to about 0.5 mm.

The conductive patterns 120 may be squares, rectangles, circles, crosses, or any suitable shape. That is, the shape of the conductive patterns 120 is not limited to any particular shape. The shape of each of the conductive patterns 120 may be modified according to the frequency of a corresponding wireless access point (WAP), which is described below in more detail. Thus, in some embodiments, a first group of conductive patterns 120 on a thin film 110 may be spaced apart from each other at a first interval and/or may have a first shape to reflect (e.g., to more efficiently reflect) electromagnetic radiation having a first frequency, and a second group of conductive patterns 120 on the thin film 110 may have a second shape and/or may be spaced apart from each other at a second interval to reflect (e.g., to more efficiently reflect) electromagnetic radiation having a second frequency. For example, WiFi access points often transmit signals in both the 2.4 GHz spectrum and the 5 GHz spectrum. Accordingly, a single wireless coverage control thin film 100 may be used to reflect (e.g., to efficiently reflect) electromagnetic radiation in both the 2.4 GHz and 5 GHz spectrums rather than having to use two separate wireless coverage control thin films 100 to efficiently reflect both spectrums.

Referring to FIG. 3, the conductive patterns 120 may have a size (e.g., a length, width, diameter, major and/or minor axis, etc.) in a range from about 1 mm to about 100 mm and may have a thickness in a range from about 0.01 mm to about 0.3 mm. As one example, the conductive pattern 120 shown in FIG. 3 has a square shape with the same length l and width w. The size of each of the conductive patterns 120 may be suitably varied according to the frequency of a corresponding wireless access point (WAP). For example, the size (e.g., the surface area) of the conductive patterns 120 may affect how efficiently electromagnetic radiation having different frequencies is reflected. For example, increasing the size of the conductive patterns 120 provides improved response for lower frequency signals.

FIG. 4A is a schematic representation of an aircraft fuselage 400 with a single wireless access point (WAP) 500.

The aircraft fuselage 400 has a generally cylindrical cross-section with the passengers arranged at a single level (or arranged in up to two levels in, for example, the 747-series aircraft and the A380-series aircraft), hereinafter referred to as the "passenger deck 410." To maximize unused space and provide greater wireless coverage, the WAP 500 is arranged at the upper middle of the aircraft fuselage 400. In this arrangement, however, much of the electromagnetic radiation emitted by the WAP is emitted in directions away from where the passengers (and the passengers' electronic devices) are arranged, thereby reducing efficiency and performance.

FIG. 4B is a schematic representation of a portion of the aircraft fuselage 400 including a wireless access system according to an embodiment of the present invention. The wireless access system includes a wireless access point (WAP) 500 and a plurality of wireless coverage control thin films 100 configured to reflect (e.g., scatter) the electromagnetic radiation emitted by the WAP 500. For example, the wireless coverage control thin films 100 may be shaped, sized, etc. as discussed above to correspond to the emission spectrum of the WAP 500.

In FIG. 4B, the wireless coverage control thin films 100 are arranged on an inside of the aircraft fuselage 400 above the passenger deck 410 adjacent to the WAP 500. In this way, the electromagnetic radiation emitted by the WAP 500 is prevented from immediately exiting the aircraft fuselage 400 and is instead reflected (and/or scattered) downwardly toward the passengers on the passenger deck 410. In some other embodiments, additional wireless coverage control thin films 100 may be arranged on the inner surface of the aircraft fuselage 400 under the passenger deck 410 with respect to the WAP 500. In this manner, electromagnetic radiation emitted by the WAP 500 that passes through the passenger deck 410 is reflected (and/or scattered) back toward the passenger deck 410. Because the wireless coverage control thin films 100 are configured to reflect and/or scatter incident electromagnetic radiation emitted by the WAP 500, wireless signal uniformity is improved and signal dead zones are reduced and/or prevented within the aircraft fuselage 400, thereby improving wireless performance without increasing the number of WAP(s) 500.

FIGS. 5A and 5B are graphic representations of wireless signal strength along the passenger deck 410 of the aircraft fuselage 400 shown in FIGS. 4A and 4B, respectively. In FIGS. 5A and 5B, only the upper half of the aircraft fuselage 400 is shown to make the wireless coverage more clear. Similarly, the wireless access point (WAP) 500 is omitted from the drawings for clarify.

Referring to FIG. 5A, when a single WAP 500 is used without the wireless coverage control thin films 100 (see, e.g., FIG. 4A), the wireless signal strength (measured in decibels (db)) has substantial variations along the passenger deck 410.

Referring to FIG. 5B, when the wireless access system including a single WAP 500 and the wireless coverage control thin films 100 (see, e.g., FIG. 4B), the wireless signal strength at the passenger deck 410 is not only more consistent but is also stronger than without the wireless coverage control thin films 100. That is, because the wireless coverage control thin films 100 efficiently reflect the electromagnetic radiation from the WAP 500, the wireless signal strength is improved and more consistent within and throughout the aircraft fuselage 400.

FIGS. 6A and 6B are graphic representations of wireless signal propagation between two vehicles. Wireless communication between vehicles may be used to facilitate autonomous driving, such as by making vehicles aware of current or pending maneuvers or speed changes, upcoming road conditions, etc. FIGS. 6A and 6B show two vehicles 600, each having a wireless transceiver 500 to communicate with each other. The front vehicle 600 in FIG. 6B further includes the wireless access system including a wireless coverage control thin film 100 according to an embodiment of the present invention.

Referring to FIG. 6A, the front vehicle 600 sends a wireless signal to the following vehicle 600 via the wireless transceiver 500. However, because the wireless transceiver 500 radiates electromagnetic radiation nearly equally in all directions, a substantial amount of the electromagnetic energy radiates upwardly, downwardly, or to the sides of the following vehicle 600. Thus, the range of the wireless transceiver 500 is reduced because the emitted electromagnetic energy is not focused.

Referring to FIG. 6B, the front vehicle 600 includes the wireless access system, which includes the wireless transceiver 500 and the wireless coverage control thin film 100, which focuses the emitted electromagnetic radiation from the wireless transceiver 500. For example, the wireless transceiver 500 may emit electromagnetic radiation through the wireless coverage control thin film 100, and the wireless coverage control thin film 100 may focus the electromagnetic radiation to be directed behind the vehicle 600 and toward the following vehicle 600 such that the range of the wireless transceiver 500 is increased. In another embodiment, the wireless coverage control thin film 100 may surround the top and three or more sides of the wireless transceiver 500 to reflect the electromagnetic radiation toward the following vehicle 600. In this way, the wireless coverage control thin film 100 may also act to focus any electromagnetic radiation (e.g., any wireless signal) received by the following vehicle 600 toward the wireless transceiver 500.

FIG. 7 is a graph showing reflected phase changes with respect to conductive pattern size (see, e.g., FIG. 3) based on a 5.8 GHz wavelength signal. By using such graph, size of the conductive pattern can be designed to efficiently control wireless coverage. As shown in FIG. 7, increasing the size of each of the conductive patterns increases the phase delay of an incident signal. For example, based on the simulation results shown in FIG. 7, it is revealed that, as one example, a conductive pattern width of 13 mm provides (or imparts) a 60° phase response to the reflected signal.

It will be understood that, although the terms "first", "second", "third", etc., may be used herein to describe various elements, components, regions, layers, levels, and/or sections, these elements, components, regions, layers, levels, and/or sections should not be limited by these terms. These terms are only used to distinguish one element, component, region, layer, level, or section from another element, component, region, layer, level, or section. Thus, a first element, component, region, layer, level, or section discussed below could be termed a second element, component, region, layer, level, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a wireless coverage control thin film and a wireless access system including the wireless coverage control thin film have been described and illustrated herein, many modifications and variations within those embodiments will be apparent to those skilled in the art. Accordingly, it is to be understood that a wireless coverage control thin film and a wireless access system including the wireless coverage control thin film according to the present disclosure may be embodied in forms other than as described herein without departing from the spirit and scope of the present disclosure. The present disclosure is defined by the following claims and equivalents thereof.

What is claimed is:

1. A wireless access system comprising:
   a wireless transceiver configured to emit electromagnetic radiation having a first frequency and a second frequency; and
   a plurality of wireless coverage control thin films,
   wherein a first one of the wireless coverage control thin films comprises:
      a first thin film; and
      a plurality of first conductive patterns on the first thin film, the first conductive patterns comprising a first conductive metal and being electrically isolated from each other,
   wherein a second one of the wireless coverage control thin films comprises:
      the first thin film;
      the first conductive patterns arranged in a pattern on the first thin film;
      a second thin film on the first conductive patterns; and
      a plurality of second conductive patterns on the second thin film and comprising a second conductive metal, the first conductive metal being different than the second conductive metal, the second conductive patterns being electrically isolated from each other and from the first conductive patterns,
   wherein the first thin film is adhered to a conductive back plane,
   wherein the first conductive patterns are configured to reflect and scatter the electromagnetic radiation having the first frequency, the second conductive patterns are configured to reflect and scatter the electromagnetic radiation having the second frequency, and
   wherein the first one and the second one of the wireless coverage control thin films are on opposite sides of the wireless transceiver.

2. The wireless access system of claim 1, wherein the first conductive patterns are arranged in a regular pattern.

3. The wireless access system of claim 2, wherein the first conductive patterns have a square shape with a side length in a range from 1 mm to 100 mm.

4. The wireless access system of claim 1, wherein the first thin film comprises silicon.

5. The wireless access system of claim 1, further comprising a protective thin film on the second conductive patterns.

6. The wireless access system of claim 1, wherein the first conductive patterns are spaced apart from each other by a first distance, and
   wherein the second conductive patterns are spaced apart from each other by a second distance, the first distance being different than the second distance.

7. The wireless access system of claim 6, wherein ones of the second conductive patterns are offset with ones of the first conductive patterns in a thickness direction of the second one of the wireless coverage control thin films.

8. The wireless access system of claim 1, wherein each of the first conductive patterns has a first surface area, and wherein each of the second conductive patterns has a second surface area, the first surface area being different than the second surface area.

9. The wireless access system of claim 7, further comprising a protective layer on the second conductive patterns.

10. The wireless access system of claim 9, wherein the first thin film and the second thin film comprise silicon.

11. The wireless access system of claim 1, wherein each conductive pattern in a first group of the first conductive patterns has a first shape, and
wherein each conductive pattern in a second group of the first conductive patterns has a second shape, the first and second shapes being different from each other.

12. The wireless access system of claim 1, wherein a center-to-center spacing between adjacent ones of the first conductive patterns is in a range of 1.2 mm to 120 mm.

13. The wireless access system of claim 1, wherein each of the first conductive patterns has a size in one direction in a range of 1 mm to 100 mm.

14. The wireless access system of claim 1, wherein each of the wireless coverage control thin films is on the respective individual conductive back plane having a surface area in a range of 0.15 $m^2$ to 2.5 $m^2$.

15. The wireless access system of claim 1, wherein the first conductive patterns are spaced apart from each other by a distance in a range between ½$\lambda$ to $\lambda$ of the first frequency, and
wherein the second conductive patterns are spaced apart from each other by a distance in a range between ½$\lambda$ to $\lambda$ of the second frequency.

16. The wireless access system of claim 1, wherein the wireless transceiver is an omnidirectional wireless transceiver.

17. The wireless access system of claim 1, wherein the conductive back plane comprises copper.

* * * * *